US011917337B2

(12) United States Patent
Shreve et al.

(10) Patent No.: US 11,917,337 B2
(45) Date of Patent: Feb. 27, 2024

(54) SYSTEM AND METHOD FOR SELECTIVE IMAGE CAPTURE ON SENSOR FLOATING ON THE OPEN SEA

(71) Applicant: Palo Alto Research Center Incorporated, Palo Alto, CA (US)

(72) Inventors: Matthew A. Shreve, Webster, NY (US); Eric Cocker, Redwood City, CA (US)

(73) Assignee: XEROX CORPORATION, Norwalk, CT (US)

( * ) Notice: Subject to any disclaimer, the term of this patent is extended or adjusted under 35 U.S.C. 154(b) by 102 days.

(21) Appl. No.: 17/463,433

(22) Filed: Aug. 31, 2021

(65) Prior Publication Data
US 2023/0060417 A1 Mar. 2, 2023

(51) Int. Cl.
*H04N 7/18* (2006.01)
*B63B 79/15* (2020.01)
*G01C 13/00* (2006.01)

(52) U.S. Cl.
CPC ............. *H04N 7/188* (2013.01); *B63B 79/15* (2020.01); *G01C 13/004* (2013.01)

(58) Field of Classification Search
CPC ....... H04N 7/188; B63B 79/15; G01C 13/004
See application file for complete search history.

(56) References Cited

U.S. PATENT DOCUMENTS

| 9,024,972 | B1 * | 5/2015 | Bronder | G06T 3/60 |
| | | | | 345/633 |
| 10,395,117 | B1 * | 8/2019 | Zhang | G01C 21/206 |
| 2003/0167125 | A1 * | 9/2003 | Seemann | G01S 7/41 |
| | | | | 702/2 |
| 2006/0116796 | A1 * | 6/2006 | Fossen | B63B 79/20 |
| | | | | 701/1 |

(Continued)

FOREIGN PATENT DOCUMENTS

CN 110246177 B 6/2021

OTHER PUBLICATIONS

Fefilatyev, Sergiy et al. "Towards detection of marine vehicles on horizon from buoy camera", Proc. of SPIE vol. 6736, 67360O, Oct. 1, 2007, DO 10.1117/12.747512, 6 pages.

*Primary Examiner* — Jared Walker
(74) *Attorney, Agent, or Firm* — Lippes Mathias LLP

(57) ABSTRACT

The present specification relates to image capture. More specifically, it relates to selective image capture for sensor carrying devices or floats deployed, for example, on the open sea. In one form, data is generated on the sensor carrying devices or floats by an on-board Inertial Measurement Unit (IMU) and is used to automatically predict the wave motion of the sea. These predictions are then used to determine an acceptable set of motion parameters that are used to trigger the on-board camera(s). The camera(s) then capture images. One consideration is that images captured at or near the peak of a wave crest with minimal pitch and roll will contain fewer obstructions (such as other waves). Such (Continued)

images provide a view further into the horizon to, for example, monitor maritime sea traffic and other phenomenon. Therefore, the likelihood of capturing interesting objects such as ships, boats, garbage, birds, . . . etc. is increased. These images may then be further processed and/or transmitted in a variety of manners.

22 Claims, 5 Drawing Sheets

(56) References Cited

U.S. PATENT DOCUMENTS

| | | | |
|---|---|---|---|
| 2006/0280034 A1* | 12/2006 | Howard | H04B 13/02 367/134 |
| 2011/0206236 A1* | 8/2011 | Center, Jr. | G06T 7/593 382/103 |
| 2015/0092048 A1* | 4/2015 | Brunner | H04W 4/33 348/135 |
| 2016/0063709 A1 | 3/2016 | Booij et al. | |
| 2016/0147223 A1* | 5/2016 | Edwards | B63B 79/40 701/2 |
| 2017/0248721 A1* | 8/2017 | Poole | G01V 1/366 |
| 2018/0129212 A1* | 5/2018 | Lee | G06F 3/017 |
| 2019/0049945 A1* | 2/2019 | Moeller | H04N 7/188 |
| 2019/0155288 A1* | 5/2019 | Arbuckle | B63B 79/15 |
| 2020/0053292 A1* | 2/2020 | Janjic | G01C 21/12 |
| 2020/0288678 A1* | 9/2020 | Howe | G06T 7/70 |
| 2020/0410274 A1* | 12/2020 | Satoh | G06V 40/103 |
| 2021/0094659 A1* | 4/2021 | Akuzawa | B63B 79/15 |
| 2021/0274126 A1 | 9/2021 | Shreve | |
| 2021/0394877 A1* | 12/2021 | Kadota | G05D 13/66 |
| 2022/0194528 A1* | 6/2022 | Todter | B63B 79/15 |
| 2022/0214689 A1* | 7/2022 | Pavlica | B63B 79/15 |
| 2023/0019084 A1* | 1/2023 | Lopes Barreto | H04N 23/698 |

* cited by examiner

SYSTEM AND METHOD FOR SELECTIVE IMAGE CAPTURE ON SENSOR FLOATING ON THE OPEN SEA

STATEMENT REGARDING FEDERALLY SPONSORED RESEARCH OR DEVELOPMENT

This invention was made with United States Government support under HR00112090101 awarded by DARPA. The United States Government has certain rights in the invention.

TECHNICAL FIELD

The present specification relates to image capture. More specifically, it relates to selective image capture for floating sensors (or sensor carrying devices or floats) deployed on the open sea. Thus, it finds suitable application in connection with oceanic sensors and will be described with particular reference thereto. However, it is to be appreciated that the subject matter described herein is equally suited to and/or adapted for other like applications.

BACKGROUND

It has been proposed to deploy inexpensive devices floating on the ocean to detect and report a variety of signals, including images, environmental information and signals generated by human activity and radio communications. For example, one proposed initiative aims to deploy a large fleet of inexpensive floating sensors (also referred to herein as floats, or sensor carrying devices or floats) that include cameras.

As proposed, the collected data including the image data collected by the float's camera is communicated from the float to a desired remote location (i.e., remote relative to the float) via a radio communication and/or wireless telecommunication link, e.g., a wireless link and/or radio communication to a satellite in orbit about the earth. The transmission of this data is generally permitted to employ and/or occupy a limited amount of time, bandwidth and/or other resources of the satellite and/or wireless link over which the transmission is being placed.

In some cases, these devices or floats may be restricted to selectively transmit acquired data with extremely limited data rates (e.g., 320 Bytes/20 minutes). As such, it is generally important to transmit only essential information that is relevant to a particular goal or objective. Also, these devices or floats have limited power storage capability. For example, when processing images captured by the on-device camera of a float, it is not possible to continuously process images through a deep neural network due to the large power consumption that would be required.

Some existing approaches are solely focused on the problem of image capture and dedicate the entire battery capacity and transmission bandwidth to this end. These types of approaches will likely not be suitable for small, lower-power multi-sensory floats.

BRIEF DESCRIPTION

In one aspect of the presently described embodiments, a system on a floating device deployed in open sea comprises a camera configured to capture images, an inertial measurement unit (IMU) configured to capture IMU data, and at least one processor and at least one memory having stored thereon code that when executed by the at least one processor triggers the camera to capture an image based on the IMU data.

In another aspect of the presently described embodiments, the at least one processor executes a calibration sequence.

In another aspect of the presently described embodiments, the at least one processor triggers the camera to capture the image based on predetermined criteria.

In another aspect of the presently described embodiments, the predetermined criteria comprises:

$z > z\_thresh \times z\_peak$ $-p\_radius < p < p\_radius$ $-r\_radius < r < r\_radius$ where z is a current estimate of the height of the sensor carrying deice or float (at, above, or below sea level), z_thresh is a percentage of average predicted wave height the device or float needs to be above to allow capture, z_peak is a maximum height of the device or float over c seconds (used to approximate height of wave crests), p is pitch, p_radius is a pitch radius the device or float needs to be within to allow capture, r is roll, and r_radius is a roll radius the device or float needs to be within to allow capture.

In another aspect of the presently described embodiments, the at least one processor triggers that camera to capture an image based on an estimate of when the sensor carrying device or float will be at a top of a wave.

In another aspect of the presently described embodiments, the estimate is based on the IMU data and a predictive routine.

In another aspect of the presently described embodiments, the predictive routine comprises implementation of a Kalman filter to predict wave behavior.

In another aspect of the presently described embodiments, a system on a floating device deployed in open sea comprises a camera configured to capture images, an inertial measurement unit (IMU) configured to capture IMU data, and at least one processor and at least one memory having stored thereon code that when executed by the at least one processor triggers the camera to capture multiple images and the at least one processor to select captured images based on the IMU data.

In another aspect of the presently described embodiments, the at least one processor executes a calibration sequence.

In another aspect of the presently described embodiments, the camera randomly captures the multiple images.

In another aspect of the presently described embodiments, the camera captures the multiple images based on a predicted crest of a wave.

In another aspect of the presently described embodiments, the at least one processor synchronizes data from the inertial measurement unit with the multiple images, filters the data from the inertial measurement unit for each captured image using predetermined criteria and selects the captured images that satisfy the predetermined criteria.

In another aspect of the presently described embodiments, the predetermined criteria comprises:

$z > z\_thresh \times z\_peak$ $-p\_radius < p < p\_radius$ $-r\_radius < r < r\_radius$ where z is a current estimate of the height of the sensor carrying deice or float (at, above, or below sea level), z_thresh is a percentage of average predicted wave height the device or float needs to be above to allow capture, z_peak is a maximum height of the device or float over c seconds (used to approximate height of wave crests), p is pitch, p_radius is a pitch radius the device or float needs to be within to allow capture, r is roll, and r_radius is a roll radius the device or float needs to be within to allow capture.

In another aspect of the presently described embodiments, a method for image capture on sensor carrying devices or floats having at least one camera and an inertial measurement unit comprises selectively initiating an image capture routine, executing a calibration sequence to predict a current height of the sensor carrying device or float, estimate sea level and predict a wave crest height, determining the current height of the sensor carrying device or float using data from the inertial measurement unit, measuring pitch and roll of the sensor carrying device or float by the inertial measurement unit, and capturing an image by the camera if predetermined criteria are satisfied based on the determined height, pitch and roll of the sensor carrying device or float.

In another aspect of the presently described embodiments, the calibration sequence comprises integrating accelerometer data of the inertial measurement unit corresponding to measured acceleration in a direction perpendicular to an ocean surface (Z) over the last w measurements to predict the current height (z) of the float or device, where w is a number of points integrated to predict current height (z), then averaging all z values to estimate the sea level, and using a maximum measured value of z over time to predict the wave crest height.

In another aspect of the presently described embodiments, the predetermined criteria comprises:

$$z > z\_thresh \times z\_peak$$

$$-p\_radius < p < p\_radius$$

$$-r\_radius < r < r\_radius$$

where z is a current estimate of the height of the sensor carrying deice or float (at, above, or below sea level), z_thresh is a percentage of average predicted wave height the device or float needs to be above to allow capture, z_peak is a maximum height of the device or float over c seconds (used to approximate height of wave crests), p is pitch, p_radius is a pitch radius the device or float needs to be within to allow capture, r is roll, and r_radius is a roll radius the device or float needs to be within to allow capture.

In another aspect of the presently described embodiments, a method for image capture on sensor carrying devices or floats having at least one camera and an inertial measurement unit comprises selectively initiating an image capture routine, executing a calibration sequence to predict a current height of the sensor carrying device or float, estimate sea level and predict a wave crest height, estimating when the sensor carrying device or float will be at a top of a wave based on the calibration sequence and output of a predictive routine, and capturing an image by the camera based on the estimating.

In another aspect of the presently described embodiments, the calibration sequence comprises integrating accelerometer data of the inertial measurement unit corresponding to measured acceleration in a direction perpendicular to an ocean surface (Z) over the last w measurements to predict the current height (z) of the float or device, where w is a number of points integrated to predict current height (z), then averaging all z values to estimate the sea level, and using a maximum measured value of z over time to predict the wave crest height.

In another aspect of the presently described embodiments, the predictive routine comprises implementation of a Kalman filter to predict wave behavior.

In another aspect of the presently described embodiments, a method for image capture on sensor carrying devices or floats having at least one camera and an inertial measurement unit comprises selectively initiating an image capture routine, executing a calibration sequence to predict a current height of the sensor carrying device or float, estimate sea level and predict a wave crest height, capturing multiple images, synchronizing data from the inertial measurement unit with the multiple images, filtering the data from the inertial measurement unit for each captured image using predetermined criteria, and selecting the captured images that satisfy the predetermined criteria.

In another aspect of the presently described embodiments, the capturing comprises randomly capturing images.

In another aspect of the presently described embodiments, the capturing comprises capturing images based on a predicted crest of a wave.

In another aspect of the presently described embodiments, the predicted height of the wave is determined using a Kalman filter to predict wave behavior.

In another aspect of the presently described embodiments, the predetermined criteria comprises:

$$z > z\_thresh \times z\_peak$$

$$-p\_radius < p < p\_radius$$

$$-r\_radius < r < r\_radius$$

where z is a current estimate of the height of the sensor carrying deice or float (at, above, or below sea level), z_thresh is a percentage of average predicted wave height the device or float needs to be above to allow capture, z_peak is a maximum height of the device or float over c seconds (used to approximate height of wave crests), p is pitch, p_radius is a pitch radius the device or float needs to be within to allow capture, r is roll, and r_radius is a roll radius the device or float needs to be within to allow capture.

DETAILED DESCRIPTION

The presently described embodiments, in at least one form, are implemented to be selective in terms of types of data and the manner in which data, in particular images, is processed due to the limited power storage capability of the devices or floats. Thus, according to least one form of the presently described embodiments, low power sensors are used to determine a suitable time to capture an image that has high likelihood of capturing interesting information in proximity to an ocean float. Other approaches that capture images on a floating platform (or buoy) on the open sea do not appear to use other internal sensors to trigger photo capture.

More particularly, in at least one form according to the presently described embodiments, data generated by an on-board Inertial Measurement Unit (IMU) is used to automatically predict the wave motion of the sea. These predictions are then used to determine an acceptable set of motion parameters that are used to trigger the on-board camera(s). The camera(s) then capture images. These images may then be further processed in a variety of manners. However, in at least one example, the images may be further processed by the ocean object detector (or senor carrying device or float) as described, for example, in pending U.S. patent application Ser. No. 16/805,326, filed Feb. 28, 2020, entitled "Compressing Image Regions Containing Detailed Objects and Simplified Backgrounds Under a Fixed Number of Bytes" and incorporated hereby by reference in its entirety. One consideration is that images captured at or near the peak of a wave crest with minimal pitch and roll will contain fewer obstructions (such as other waves). Such images provide a view further into the horizon to, for example, monitor maritime sea traffic and other phenomenon. Therefore, the likelihood of capturing interesting objects such as ships, boats, garbage, birds, . . . etc. is increased.

Figure 1:
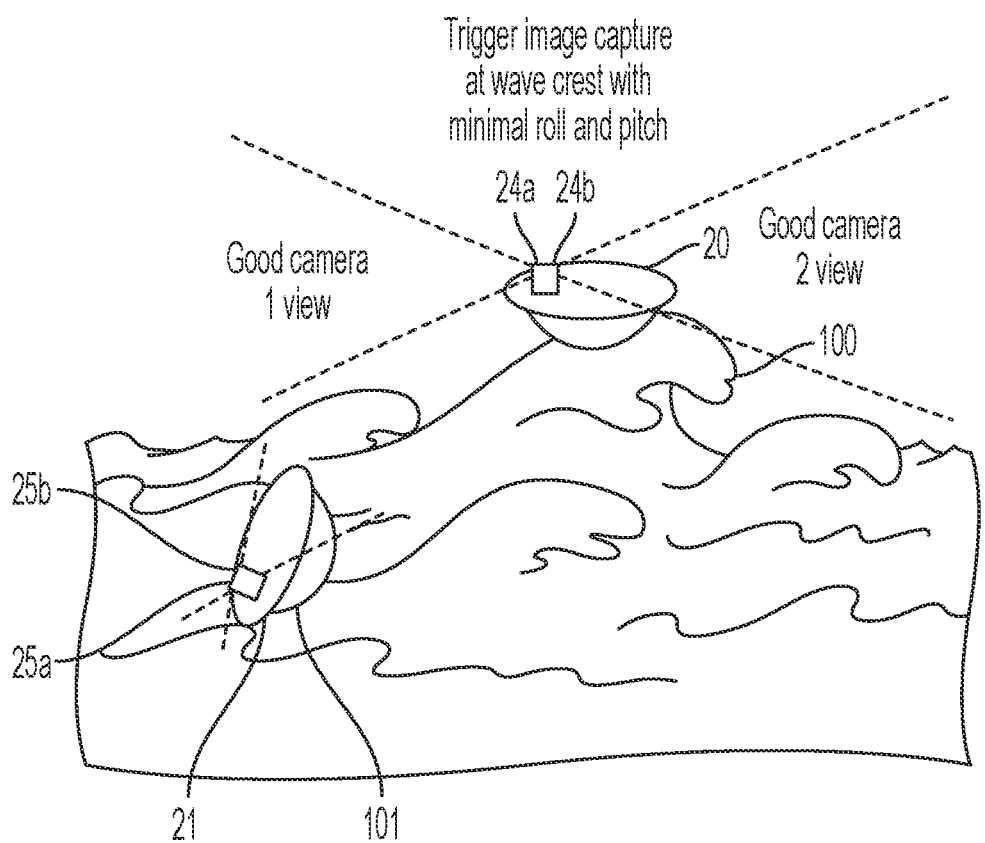
FIG. 1 is an illustration of a system according to the presently described embodiments.

With reference to FIG. 1, a sensor carrying device or float 20 is shown deployed in the open sea. The sensor carrying device or float 20 has positioned thereon at least one camera. In this example, the sensor carrying device or float has two (2) cameras 24a and 24b. It should be appreciated, however, the sensor carrying device or float 20 may include any number of cameras suitable for the size, purpose or intended use for the implementation and deployment, and configuration of the overall system. In this example, at the position shown, e.g., at or near the peak of a wave crest 100 with minimal pitch and roll, the sensor carrying device or float 20 has multiple available camera views. In this example at a given moment in time, camera 24a has an acceptable view and camera 24b has an acceptable view for obtaining images of the horizon and objects on the horizon.

With continuing reference to FIG. 1, a sensor carrying device or float 21 is also shown deployed in the open sea. The sensor carrying device or float 21 has positioned thereon at least one camera. In this example, the sensor carrying device or float has two (2) cameras 25a and 25b. It should be appreciated, however, the sensor carrying device or float 21 may include any number of cameras suitable for the size, purpose or intended use for the implementation and deployment, and configuration of the overall system. In this example, at the position shown, e.g., at or near the bottom of a wave trough 101 with high pitch and roll, the sensor carrying device or float 20 has multiple available views as well. In this example at a given moment in time, however, camera 25a has an unacceptable view and camera 25b has an unacceptable view for obtaining images of the horizon and objects on the horizon.

It should be appreciated, though, that the purpose of the sensor carrying devices or floats 20 and 21 may vary from the example purpose of identifying objects on the horizon. For example, implementations of such sensor carrying devices or floats may include a variety of types of implementation having different purposes and objective. For example, implementations also include capturing various images of the water (e.g., the color of the water) to provide data for analytic purposes or capturing images of the sky, objects in the sky such as planes or birds, or the moon to provide useful monitoring or environmental data. In such cases, the sensor carrying device or float 21, as shown, has an acceptable view for the camera 25a to capture a close-up image of the water and an acceptable view for the camera 25b to capture an image of the sky. As will be described in greater detail below, the presently described embodiments will, in at least one form, be implemented and configured to achieve the intended objectives of the system.

Figure 2:
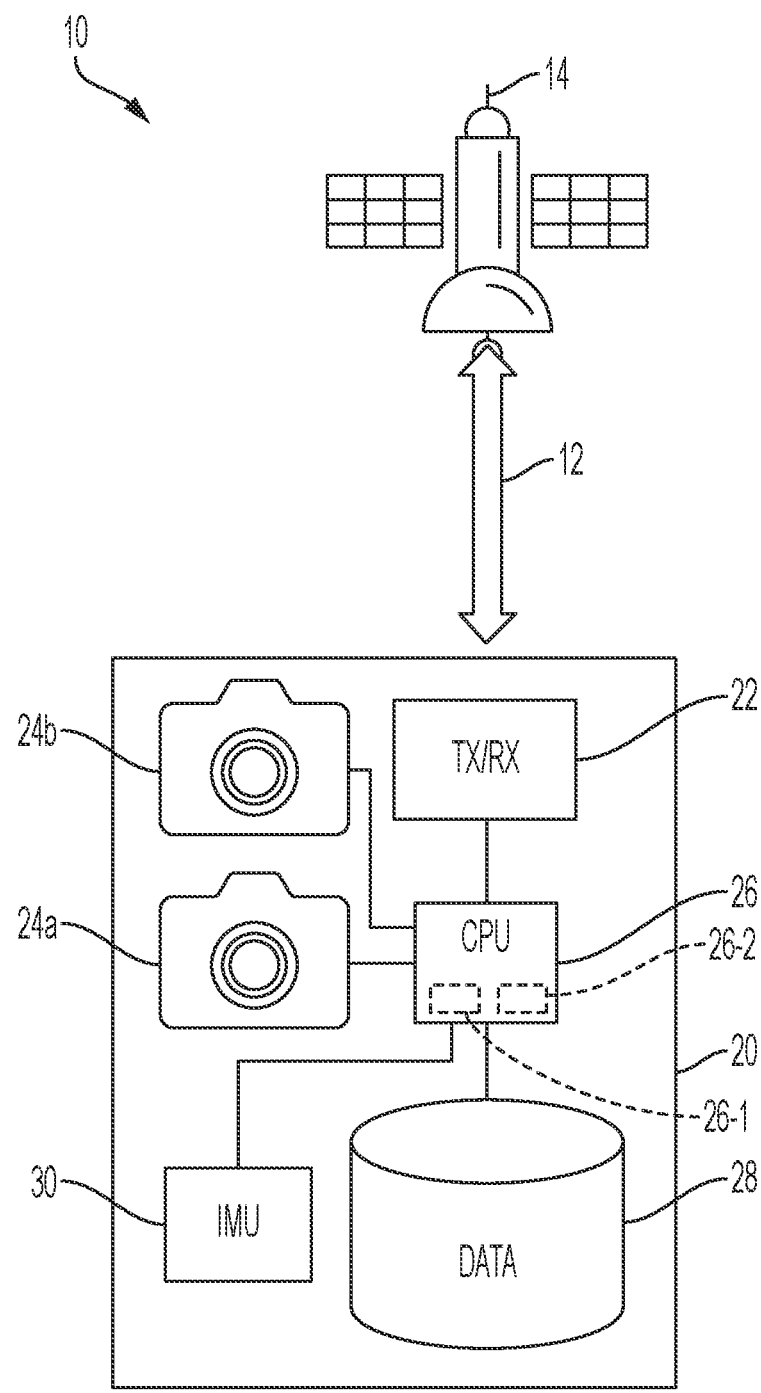
FIG. 2 is an illustration of a system according to the presently described embodiments.

With reference now to FIG. 2, the sensor carrying device or float 20 and the system in which it will, in at least one form, be implemented and deployed, will be described in greater detail. As shown, there is illustrated an exemplary embodiment of a system 10 including the sensor carrying device or float 20. In practice in this example, the sensor carrying device or float 20 is equipped and/or otherwise provisioned with a transceiver 22. Via the transceiver 22, the sensor carrying device or float 20 wirelessly communicates (i.e., transmits and/or receives messages, signals and/or data) over a wireless telecommunications link 12. As shown, the link 12 operatively, wirelessly connects the sensor carrying device or float 20 to a satellite 14 in orbit about the Earth or other planet on which the sensor carrying device or float 20 is situated. In practice, the satellite 14 operates to relay messages, data and/or signals between the sensor carrying device 20 and an end user device, e.g., such as a computer, server or the like located remotely away from the sensor carrying device or float 20, which end user device receives data originating from the sensor carrying device or float 20 and/or administers operation thereof.

As shown, the sensor carrying device or float 20 is equipped and/or otherwise provisioned with at least one camera, but in this example case, two (2) cameras 24a and 24b, e.g., digital cameras, that selectively captures images of the environment in which the sensor carrying device 20 is placed. Although two (2) cameras are shown, any number of cameras (e.g. 1, 2, 3, 4, . . . ) could be used depending on the implementation. It should be appreciated that the camera(s) (only representatively shown for ease of illustration) will be suitably positioned on the float to achieve the objective of the implementation, e.g., to achieve suitable views in expected orientations to capture desired imaging. Suitably, the sensor carrying device or float 20 is made to be sufficiently buoyant to float on the surface of a body of water, e.g., such as an ocean, sea, lake, etc. In practice, the sensor carrying device or float 20 may be implemented as or on a buoy or the like and will be, on occasion, referred to herein as a float. It should be appreciated, however, that the presently described embodiments are most advantageously implemented in environments where small, lower-power multi-sensory floats are utilized. However, the presently described embodiments will nonetheless have advantages if implemented on traditional buoys with less power limitations.

Further, the sensor carrying device or float 20 includes an Inertial Measurement Unit (IMU) 30. The IMU 30 measures change in the pose or position of the sensor carrying device or float 20. The IMU 30 may also measure the velocity and other operational characteristics of the sensor carrying device or float 20. Such devices are well known and operate to measure and output forces, angular rates and orientation of an object. Typically, IMUs use accelerometers, gyroscopes and/or magnetometers to gather data. Here, a variety of configurations could be utilized, but in at least on form of the presently described embodiments, the IMU 30 operates in appropriate ways to utilize suitable sensors to measure and output data on, for example, pitch, roll and yaw, as well as other positional, orientational or operational data related to the sensor carrying device or float 20.

In a suitable embodiment, the sensor carrying device or float 20 is equipped and/or otherwise provisioned with a central processing unit (CPU) and/or data processor 26 and a data storage device 28. Of course, it should be appreciated that the processor 26 is provided with suitable non-transitory memory structures (not shown unless data storage 28 is used of such purposes) such as a memory or memories having stored therein code, instructions or routines that can be executed by the processor to perform functions or trigger or enable other components to perform functions. In practice, the data processor 26 controls operation of the sensor carrying device or float 20 and/or regulates operation of the various components thereof. Measurements and/or data collected, generated and/or produced by the sensors (e.g., cameras and IMU sensors) carried on the sensor carrying device or float 20, including IMU data on the pose and velocity of the sensor carrying device or float 20 generated, produced and/or output by the IMU 30 and image data generated, produced and/or output by, for example, the cameras 24a and 24b as a result of image(s) being captured thereby, are suitably stored by and/or maintained in the data storage device 28.

Additionally, the data processor 26 suitably performs image and/or other data processing on the image data as described herein. The results of such image and/or other data processing performed on the image data (which results are referred to herein, on occasion, as the processed image data) may likewise be stored by and/or maintained in the data storage device 28. Suitably, the data storage device 28 may also store and/or maintain instructions, software, program code and/or the like which is executed by the data processor 26 to carry out the function(s) thereof and/or operation(s) performed thereby.

Further, the data processor 26 may be configured in a variety of different manners including as a system comprising multiple dedicated processor elements to perform specific functions or groups of functions. For example, in one form, more than one processor element is provided. A first processor element 26-1 tracks data constantly, or tracks data using dense reading techniques, for example, every two (2) to four (4) minutes. In at least one form, this processor element 26-1 operates in a low-power mode. The types of tracked data may include, for example, atmospheric data, water data (e.g., salinity) or volatile organic compounds (voc) sensor data (related to, for example, plankton in the water). The first processor element, in one form, also controls and tracks the data generated by the IMU 30.

A second processor element 26-2 may be provided that is triggered or engaged (or "wakes up") periodically, e.g., approximately every twenty (20) minutes. In one form, this second processor element is a higher power element than the first processor element. The second processor element triggers the camera or cameras to capture and process images at an appropriate time and then transfer the captured images via satellite or cloud-based system. The second processor element also has access to the IMU 30 for purpose of determining the appropriate moment to capture an image, as will be set forth in greater detail below.

As alluded to above, it will be appreciated that the processor 26 and/or processor elements 26-1 and 26-2 (and any other processing devices implemented) will, in at least one form, use any of a variety of different memory devices (not shown except that such devices may be represented by or incorporated in memory device 28 in some examples). Such devices, for example, will take the form of non-transitory computer or machine-readable mediums having code or instruction, stored thereon, for execution by the appropriate processors to enable or cause the system to perform or function as described.

In practice, the processed image data is wirelessly transmitted via the transceiver 22 from the sensor carrying device or float 20 over the link 12, e.g., to the satellite 14 which in turn relays the processed image data to the end user device. Suitably, the processed image data is relayed to the end user device from the satellite 14 over a suitable telecommunications network with which the satellite 14 is in operative communication.

In practice, due to the limited resources of the satellite 14, traffic constraints on the link 12 and/or otherwise, a significantly limited bandwidth and/or data rate is established and/or imposed for the transmission of data, including image data, from the sensor carrying device or float 20 over the link 12. For example, the afore-mentioned bandwidth and/or data rate may be limited to around no more than 320 bytes per 20 minutes. Accordingly, the image and/or other data processing performed by the sensor carrying device or float 20 (e.g., via the data processor 26) generates and/or produces processed image data which is suitably compressed to fit within a designated size, e.g., within a set limit and/or determined number of bytes or bits. As noted above, in at least one example, this may be accomplished as described, for example, in pending U.S. patent application Ser. No. 16/805,326, filed Feb. 28, 2020, entitled "Compressing Image Regions Containing Detailed Objects and Simplified Backgrounds Under a Fixed Number of Bytes" and incorporated hereby by reference in its entirety. In this way, the processed image data can be efficiently transmitted from the sensor carrying device or float 20 (e.g., via the transceiver 22) over the link 12 within the allotted bandwidth and/or at the imposed data rate while maintaining a suitable amount of desired information from the corresponding image captured by the camera 24.

As noted above, according to the presently described embodiments, sensor data generated by the IMU 30 is used to determine a suitable moment in time to capture an image that has high likelihood of capturing interesting information in proximity to the sensor carrying device or float 20. In at least one form of the presently described embodiments, the following parameter list is useful for understanding the following description:

$p$: pitch $r$: roll $z$: current estimate of float height (at, above, or below sea level)

$z\_thresh$: percentage of average predicted wave height float needs to be above to allow capture $z\_mean$: the mean height of the float over c seconds. Used to approximate sea level.

$z\_peak$: the max height of the float over c seconds. Used to approximate height of wave crests.

$c$: the time (seconds) used to collect IMU data for calibration $p\_radius$: pitch radius float needs to be within to allow capture $r\_radius$: roll radius float needs to be within to allow captured $w$: number of points integrated to predict current height ($z$)

Accordingly, when the sensor carrying device or float 20 requests images to be captured, a calibration routine is executed. The calibration routine is initiated periodically (e.g., every twenty (20) minutes) by the processor 26 or, in some forms, the second processor element. In this regard, accelerometer data corresponding to the measured acceleration in the direction perpendicular to the ocean surface (Z) is integrated over the last w measurements to predict the float height z. All z values are then averaged to estimate sea-level (z_mean). The maximum measured z value over this time is used to predict the wave crest height. In at least one form, the calibration routine requires approximately fifteen (15) seconds.

After this calibration routine, in at least one form, the system pauses for approximately 10 seconds. After ten (10) seconds, the system initiates routines to selectively capture images that can later be transmitted to, for example, the satellite or cloud-based network referenced above.

In one approach to the selective image capture, after calibration has completed, a continuous loop is executed that actively predicts the height z of the float while additionally collecting the estimated pitch (p) and roll (r) as measured by the IMU. If the following three criteria are satisfied, an image is captured by the camera:

$$z > z\_thresh \times z\_peak \qquad 1.$$

$$-p\_radius < p < p\_radius \qquad 2.$$

$$-r\_radius < r < r\_radius \qquad 3.$$

In a second approach to the selective image capture, in some cases, it may not be possible to immediately trigger the camera when the above criteria (1-3) are met. For example, there might be a short time delay, e.g., a couple seconds delay, between the time when the IMU data has been received and processed and when the camera captures a photo. In this case, predictive routines or algorithms, for example, a Kalman filter, may be used to predict wave behavior and estimate when the float will be at the top of a wave and trigger a capture at that moment. It should be appreciated that other types of filters or models may be used for this prediction and/or estimate. For example, any suitable linear predictive model that processes small changes in velocity between frames or windows may be used. An average over several frames or windows may also be used.

In a third approach to the selective image capture, multiple images are captured, stored in, for example, memory 28, and then later selected for further processing. With respect to capturing multiple images, in at least one form, five (5) to ten (10) images may be captured depending on battery life and capacity. A variety of techniques to capture these images could be used. For example, in a first case, the camera randomly collects images at random points in time and does not use a wave height prediction at all. As a further example, in a second case, the camera captures several images at or near the predicted crest of the wave. In this case, as in the description above, predictive routines or algorithms, for example, a Kalman filter, may be used to predict wave behavior and estimate when the float will be at the top of a wave and trigger a capture at that moment. It should be appreciated that other types of filters or models may be used for this prediction and/or estimate. For example, any suitable linear predictive model that processes small changes in velocity between frames or windows may be used. An average over several frames or windows may also be used.

In both cases, the IMU is synchronized to capture all relevant data each time an image is captured. Next, the corresponding IMU data for each captured image is filtered using the above criteria (1-3). Images that satisfy these criteria are passed along for further processing, while image(s) that fail to meet the criteria are removed. In the case that no image passes the criteria, the relevant thresholds may be relaxed or the image that is closest to satisfying the criteria is selected.

Figure 3:
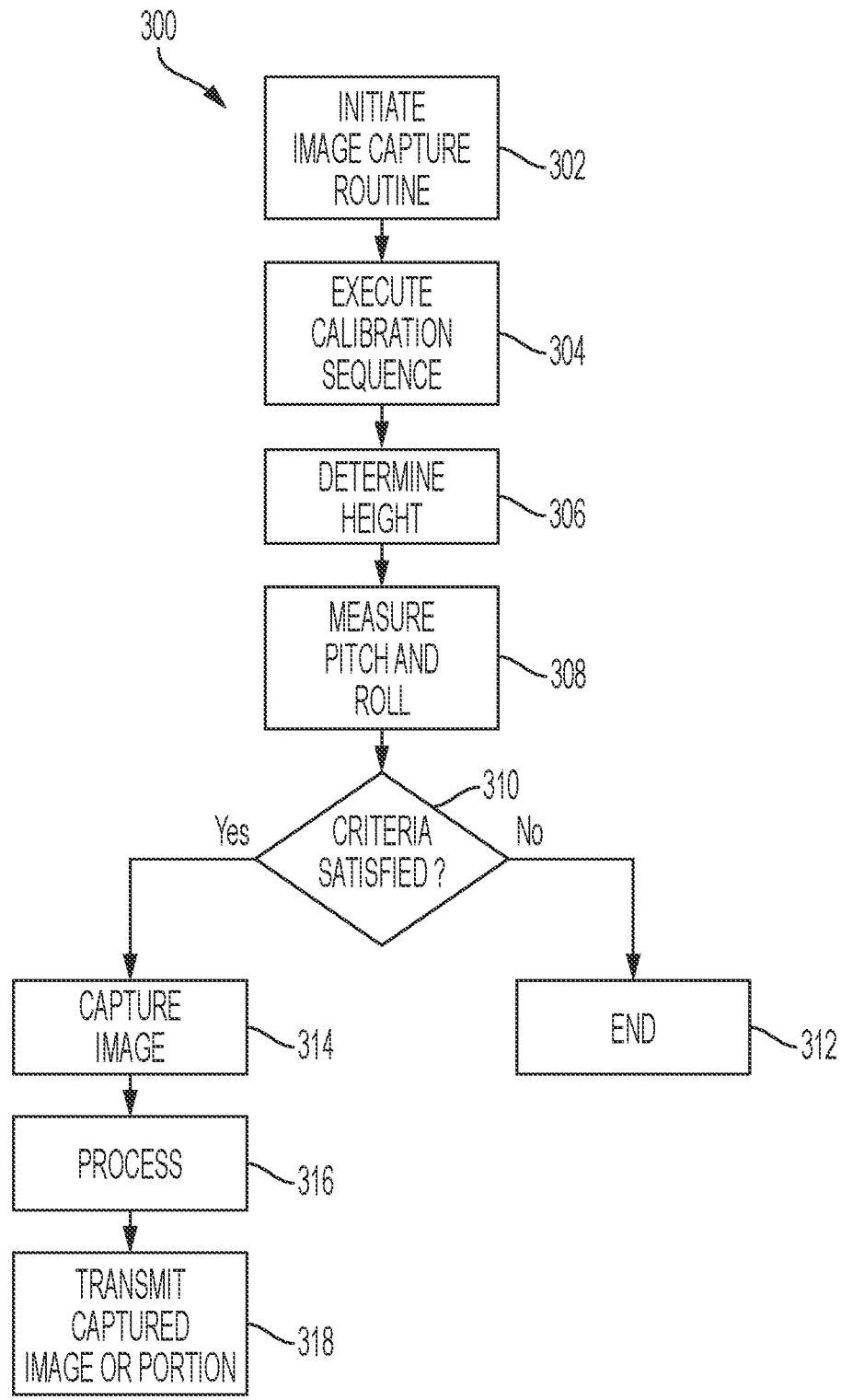
FIG. 3 is an illustration of a method according to the presently described embodiments.
Figure 4:
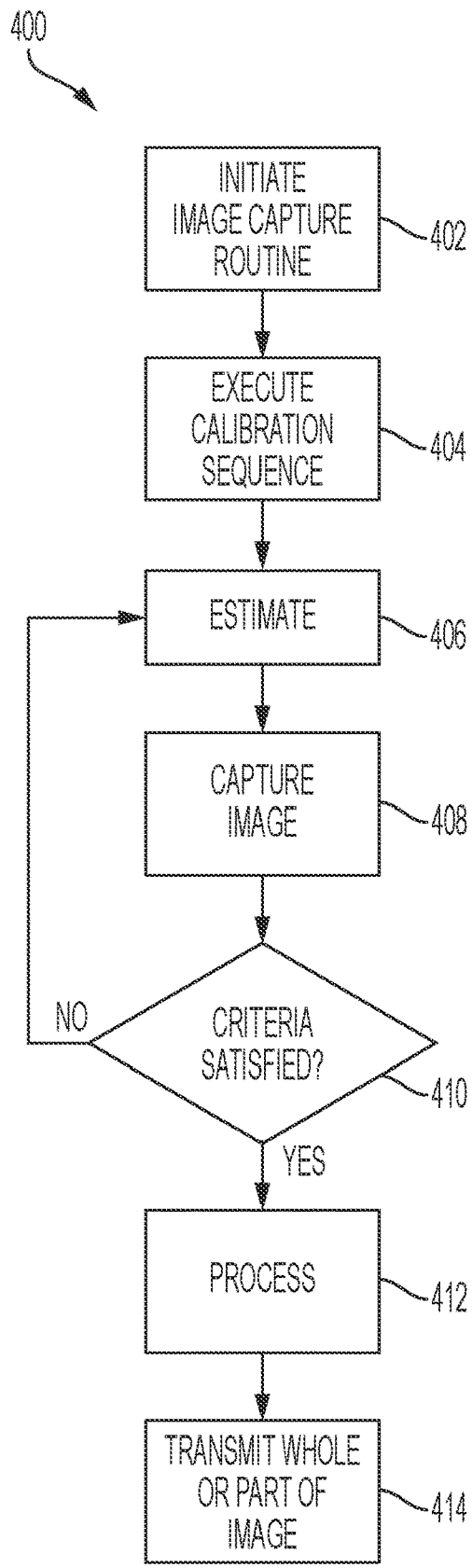
FIG. 4 is an illustration of a method according to the presently described embodiments; and, FIG. 5 is an illustration of a method according to the presently described embodiments.
Figure 5:
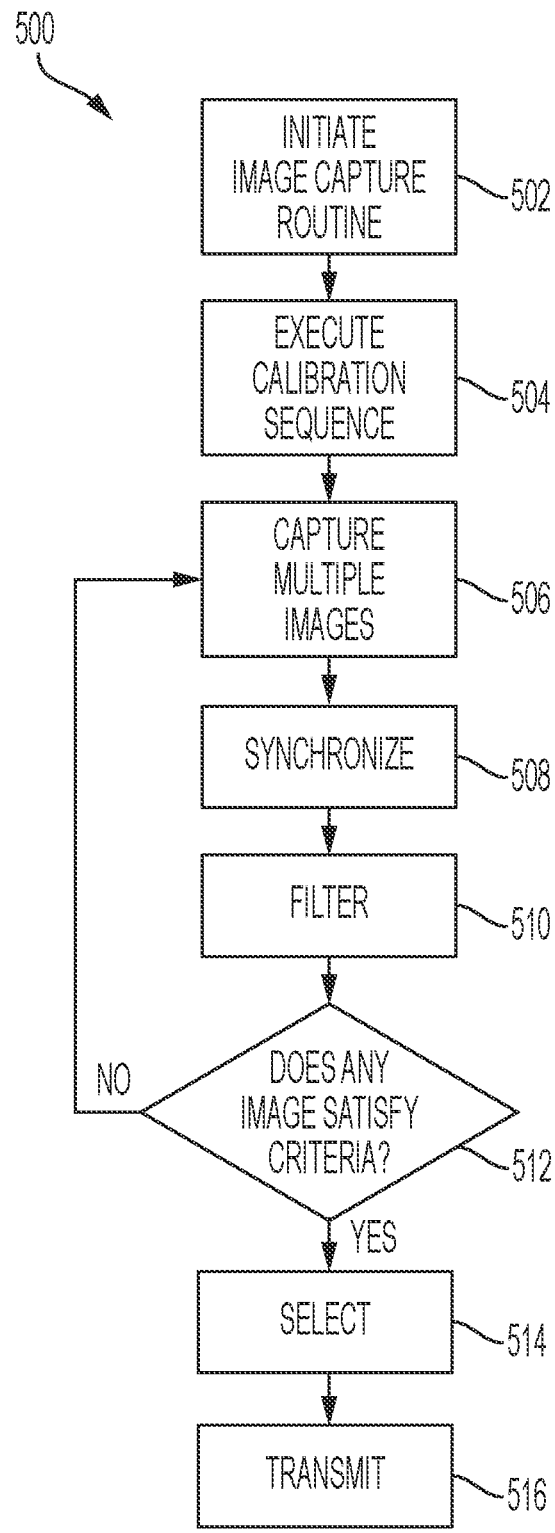

To further explain, reference is now made to FIGS. 3-5, all of which are flow charts illustrating example methods according to the presently described embodiments. It should be appreciated that the example methods described herein and others according to the presently described embodiments could be implemented using the systems described in connection with FIG. 1-2 and/or other suitable systems.

Referring to FIG. 3, a method for image capture on sensor carrying devices or floats having at least one camera and an inertial measurement unit is illustrated. As shown, the method 300 is commenced by selectively initiating an image capture routine (at 302). As noted, the initiation of the image capture routine could be accomplished in a variety of manners and at a variety of different time periods; however, in one form, the image capture routine is initiated approximately every twenty (20) minutes. Next, a calibration sequence is executed (at 304). The calibration sequence is implemented to predict a current height of the sensor carrying device or float, estimate sea level and predict a wave crest height. In one form, the calibration sequence will require approximately fifteen (15) seconds to run. In at least one form, the image capture routine pauses for approximately ten (10) seconds. The current height of the sensor carrying device or float is then determined (at 306) using data from the inertial measurement unit. Pitch and roll of the sensor carrying device or float is measured by the inertial measurement unit (at 308). A determination is then made whether predetermined criteria are satisfied (at 310). The predetermined criteria, in at least one form, is set forth above. If the predetermined criteria are not satisfied, the routine is ended (at 312) and the system awaits the next opportunity to capture images. However, if the predetermined criteria are satisfied, the camera is triggered by the processor to capture an image (at 314). In one form, as noted, the image(s) is captured by the camera(s) if the predetermined criteria are satisfied based on the determined height, pitch and roll of the sensor carrying device or float. The captured image(s) is then processed (at 316) and transmitted in a suitable manner (at 318). It should be appreciated that a whole image(s) or portions of the image(s) may be transmitted, depending on the implementation.

Referring to FIG. 4, another method for image capture on sensor carrying devices or floats having at least one camera and an inertial measurement unit is illustrated. As shown, the method 400 is commenced by selectively initiating an image capture routine (at 402). As noted, the initiation of the image capture routine could be accomplished in a variety of manners and at a variety of different time periods; however, in one form, the image capture routine is initiated approximately every twenty (20) minutes. Next, a calibration sequence is executed (at 404). The calibration sequence is implemented to predict a current height of the sensor carrying device or float, estimate sea level and predict a wave crest height. In one form, the calibration sequence will require approximately fifteen (15) seconds to run. In at least one form, the image capture routine pauses for approximately ten (10) seconds. Next, an estimate is determined as to when the sensor carrying device or float will be at a top of a wave (at 406). In at least one form, this estimate is based on the calibration sequence and output of a predictive routine. The predictive routine could vary, however, one example implementation uses a Kalman Filter to predict the behavior of the waves. Next, an image(s) is captured by the camera(s) based on the estimating (at 408). A determination is then made whether any of the criteria are satisfied (at 410). If not, estimating and capturing are repeated. If the criteria for the image(s) are satisfied, the image(s) is processed (at 412). The captured image(s) is then transmitted (at 414). Again, a whole image(s) or parts or portions of the image(s) may be transmitted, depending on the implantation.

Referring to FIG. 5, another method for image capture on sensor carrying devices or floats having at least one camera and an inertial measurement unit is illustrated. As shown, the method 500 is commenced by selectively initiating an image capture routine (at 502). As noted, the initiation of the image capture routine could be accomplished in a variety of manners and at a variety of different time periods; however, in one form, the image capture routine is initiated approximately every twenty (20) minutes. Next, a calibration sequence is executed (at 504). The calibration sequence is implemented to predict a current height of the sensor carrying device or float, estimate sea level and predict a wave crest height. In one form, the calibration sequence will require approximately fifteen (15) seconds to run. In at least one form, the image capture routine pauses for approximately ten (10) seconds. Next, multiple images are captured (at 506). As noted above, these images may be captured randomly or on a predictive basis. Data from the inertial measurement unit is then synchronized with the multiple images (at 508). Predetermined criteria are then used to filter the data from the inertial measurement unit for each captured image using predetermined criteria. Based on this filtering, it is determined which captured images satisfy the predetermined criteria based on the data from the inertial measurement unit (at 512). If none of the images satisfy the criteria, more images are captured, if possible. However, if at least one image satisfies the criteria, the captured images that satisfy the predetermined criteria are selected (at 514). Selection of images could be based on a variety of factors including image quality or criteria such as minimum roll and pitch and/or maximum height (z). The selected images are then suitably transmitted (at 516). Again, whole images or parts or portions of images may be transmitted. Also, suitable image processing may be accomplished at any of a variety of points in the method 500.

The above methods, system, platforms, modules, processes, algorithms and/or apparatus have been described with respect to particular embodiments. It is to be appreciated, however, that modifications and/or alteration are also contemplated. For example, the function of transmitting may be modified, eliminated or delayed in certain implementations.

For clarity and simplicity, the present specification refers to structural and/or functional elements, relevant standards, algorithms and/or protocols, and other components, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific element presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the Figures.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine-readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to exemplary embodiments. Obviously, modifications and alterations will occur to others upon reading and understanding the present specification. It is intended that all such modifications and alterations are included herein insofar as they come within the scope of the appended claims or the equivalents thereof. It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system on a floating device deployed in open sea, the system comprising:
   a camera configured to capture images;
   an inertial measurement unit (IMU) configured to capture IMU data; and,
   at least one processor and at least one memory having stored thereon code that when executed by the at least one processor triggers the camera to capture an image based on the IMU data and predetermined criteria, wherein the predetermined criteria comprises:

$z > z\_thresh \times z\_peak$ $-p\_radius < p < p\_radius$ $-r\_radius < r < r\_radius$ where z is a current estimate of the height of the sensor carrying device or float (at, above, or below sea level), z_thresh is a percentage of average predicted wave height the device or float needs to be above to allow capture, z_peak is a maximum height of the device or float over c seconds (used to approximate height of wave crests), p is pitch, p_radius is a pitch radius the device or float needs to be within to allow capture, r is roll, and r_radius is a roll radius the device or float needs to be within to allow capture.

2. The system as set forth in claim 1 wherein the code when executed by the at least one processor executes a calibration sequence.

3. The system as set forth in claim 1 wherein the code when executed by the at least one processor triggers the camera to capture an image based on an estimate of when the sensor carrying device or float will be at a top of a wave.

4. The system as set forth in claim 3 wherein the estimate is based on the IMU data and a predictive routine.

5. The system as set forth in claim 4 wherein the predictive routine comprises implementation of a Kalman filter to predict wave behavior.

6. A system on a floating device deployed in open sea, the system comprising:
   a camera configured to capture images;
   an inertial measurement unit (IMU) configured to capture IMU data; and,
   at least one processor and at least one memory having stored thereon code that when executed by the at least one processor triggers the camera to capture multiple images and the at least one processor to select captured images based on the IMU data, wherein the code when executed by the at least one processor synchronizes data from the inertial measurement unit with the multiple images, filters the data from the inertial measurement unit for each captured image using predetermined criteria and selects the captured images that satisfy the predetermined criteria.

7. The system as set forth in claim 6 wherein the code when executed by the at least one processor executes a calibration sequence.

8. The system as set forth in claim 6 wherein the camera randomly captures the multiple images.

9. The system as set forth in claim 6 wherein the camera captures the multiple images based on a predicted crest of a wave.

10. The system as set forth in claim 6 wherein the predetermined criteria comprises:

$z > z\_thresh \times z\_peak$ $-p\_radius < p < p\_radius$ $-r\_radius < r < r\_radius$ where z is a current estimate of the height of the sensor carrying deice or float (at, above, or below sea level), z_thresh is a percentage of average predicted wave height the device or float needs to be above to allow capture, z_peak is a maximum height of the device or float over c seconds (used to approximate height of wave crests), p is pitch, p_radius is a pitch radius the device or float needs to be within to allow capture, r is roll, and r_radius is a roll radius the device or float needs to be within to allow capture.

11. A method for image capture on sensor carrying devices or floats having at least one camera and an inertial measurement unit, the method comprising:
    selectively initiating an image capture routine;
    executing a calibration sequence to predict a current height of the sensor carrying device or float, estimate sea level and predict a wave crest height;
    determining the current height of the sensor carrying device or float using data from the inertial measurement unit;
    measuring pitch and roll of the sensor carrying device or float by the inertial measurement unit; and,
    capturing an image by the camera if predetermined criteria are satisfied based on the determined height, pitch and roll of the sensor carrying device or float.

12. The method as set forth in claim 11 wherein the calibration sequence comprises integrating accelerometer data of the inertial measurement unit corresponding to measured acceleration in a direction perpendicular to an ocean surface (Z) over the last w measurements to predict the current height (z) of the float or device, where w is a number of points integrated to predict current height (z), then averaging all z values to estimate the sea level, and using a maximum measured value of z over time to predict the wave crest height.

13. The method as set forth in claim 11 wherein the predetermined criteria comprises:

$$z > z\_thresh \times z\_peak$$

$$-p\_radius < p < p\_radius$$

$$-r\_radius < r < r\_radius$$

where z is a current estimate of the height of the sensor carrying deice or float (at, above, or below sea level), z_thresh is a percentage of average predicted wave height the device or float needs to be above to allow capture, z_peak is a maximum height of the device or float over c seconds (used to approximate height of wave crests), p is pitch, p_radius is a pitch radius the device or float needs to be within to allow capture, r is roll, and r_radius is a roll radius the device or float needs to be within to allow capture.

14. A method for image capture on sensor carrying devices or floats having at least one camera and an inertial measurement unit, the method comprising:
selectively initiating an image capture routine;
executing a calibration sequence to predict a current height of the sensor carrying device or float, estimate sea level and predict a wave crest height;
estimating when the sensor carrying device or float will be at a top of a wave based on the calibration sequence and output of a predictive routine; and,
capturing an image by the camera based on the estimating.

15. The method as set forth in claim 14 wherein the calibration sequence comprises integrating accelerometer data of the inertial measurement unit corresponding to measured acceleration in a direction perpendicular to an ocean surface (Z) over the last w measurements to predict the current height (z) of the float or device, where w is a number of points integrated to predict current height (z), then averaging all z values to estimate the sea level, and using a maximum measured value of z over time to predict the wave crest height.

16. The method as set forth in claim 14 wherein the predictive routine comprises implementation of a Kalman filter to predict wave behavior.

17. A method for image capture on sensor carrying devices or floats having at least one camera and an inertial measurement unit, the method comprising:
selectively initiating an image capture routine;
executing a calibration sequence to predict a current height of the sensor carrying device or float, estimate sea level and predict a wave crest height;
capturing multiple images;
synchronizing data from the inertial measurement unit with the multiple images;
filtering the data from the inertial measurement unit for each captured image using predetermined criteria; and,
selecting the captured images that satisfy the predetermined criteria.

18. The method as set forth in claim 17 wherein the capturing comprises randomly capturing images.

19. The method as set forth in claim 17 wherein the capturing comprises capturing images based on a predicted crest of a wave.

20. The method as set forth in claim 19 wherein the predicted height of the wave is determined using a Kalman filter to predict wave behavior.

21. The method as set forth in claim 17 wherein the predetermined criteria comprises:

$$z > z\_thresh \times z\_peak$$

$$-p\_radius < p < p\_radius$$

$$-r\_radius < r < r\_radius$$

where z is a current estimate of the height of the sensor carrying deice or float (at, above, or below sea level), z_thresh is a percentage of average predicted wave height the device or float needs to be above to allow capture, z_peak is a maximum height of the device or float over c seconds (used to approximate height of wave crests), p is pitch, p_radius is a pitch radius the device or float needs to be within to allow capture, r is roll, and r_radius is a roll radius the device or float needs to be within to allow capture.

22. The system as set forth in claim 1, wherein the image is captured by the camera if the predetermined criteria are satisfied based on determined height, pitch, and roll of the floating device.

* * * * *